Sept. 15, 1964 W. L. GARFIELD 3,149,243

RADIO RECEIVER INCLUDING A MONITORING CIRCUIT INDICATING AN OUTPUT UPON INPUT EXCEEDING PREDETERMINED FREQUENCY

Filed July 10, 1962 2 Sheets-Sheet 1

Inventor
WILLIAM L. GARFIELD
By Percy P. Lantzy
Attorney

Sept. 15, 1964 W. L. GARFIELD 3,149,243
RADIO RECEIVER INCLUDING A MONITORING CIRCUIT INDICATING AN OUTPUT UPON INPUT EXCEEDING PREDETERMINED FREQUENCY
Filed July 10, 1962
2 Sheets-Sheet 2

Inventor
WILLIAM L. GARFIELD
By [signature]
Attorney 3,149,243

RADIO RECEIVER INCLUDING A MONITORING CIRCUIT INDICATING AN OUTPUT UPON INPUT EXCEEDING PREDETERMINED FREQUENCY

William Littery Garfield, London, England, assignor to International Standard Electric Corporation, New York, N.Y., a corporation of Delaware Filed July 10, 1962, Ser. No. 208,777
Claims priority, application Great Britain July 14, 1961
3 Claims. (Cl. 307—88.5)

This invention relates to a radio receiver which includes a monitoring circuit designed to give an indication of the presence of interference pulses on a received signal.

It is often very important to know when the quality of a received signal has been so degraded by the presence of noise interference that the information obtained from the output of a receiver is incorrect.

This is particularly true in the case of the signal received by a radio altimeter receiver in an aircraft, and one application of the present invention is in receivers of this type.

Radio altimeter receivers which operate by counting the transitions of a signal are liable to error when the signal is modified or distorted by interference pulses which produce additional transitions of the signal.

The present invention provides a receiver in which an indication is given of the presence of pulses of this type.

Figures 1, 2A, 2B, 2C, 2D, 2E:
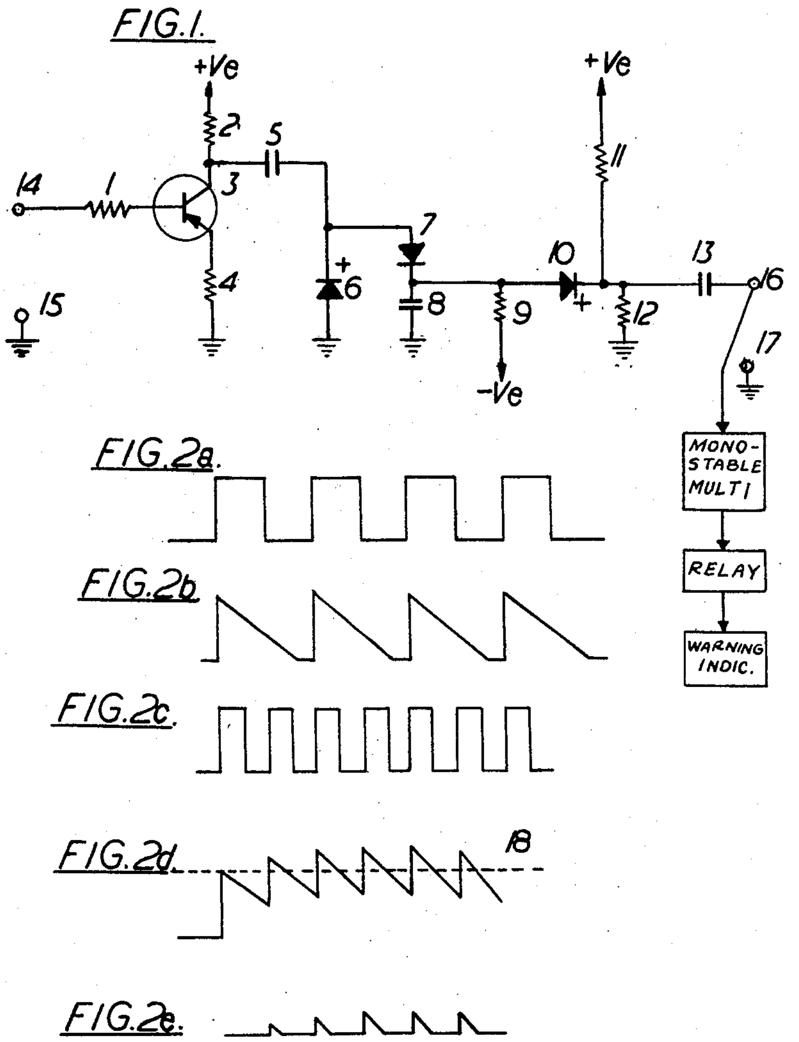

An embodiment of the invention which forms a part of an aircraft radio altimeter receiver will now be described with reference to the accompanying drawings which show in FIG. 1 a circuit diagram of the embodiment and in FIGS. 2 and 3 illustrations of waveforms existing at various points in the circuit.

The radio altimeter receiver, of which the particular embodiment of the invention about to be described forms a part, is installed with a radio altimeter transmitter in an aircraft. The receiver receives a C.W. frequency modulated signal, radiated from an antenna connected to the output of the transmitter and reflected from the ground to an antenna connected to the input of the receiver.

This signal is mixed in the receiver with a second signal, obtained from the transmitter via a cable. A beat signal, having a frequency equal to the frequency difference between the signals received by the two paths, is derived from the output of the mixer. The frequency of the beat signal depends upon the length of the path traversed by the signal radiated from the transmitting antenna and reflected from the ground to the receiving antenna. The height of the aircraft can therefore be determined from a measurement of the frequency of the beat signal. A convenient method of doing this is to count the transitions in a counting circuit, of a square wave signal obtained by amplifying and limiting the beat signal. The word "transition," as used here, refers to the abrupt changes in the sign of the signal which occur at the edges of the square wave.

Interference pulses superimposed on the region of the beat signal sine wave which lies within the dynamic range of the amplitude limiter, will appear also on the edge of the square wave, and will cause an error in the counter output.

The function of the circuit to be described is to detect the presence of noise on the edges of a square wave signal which is derived from the beat signal, in order to operate an indicator to give warning that the counter output is not accurate. The circuit includes a limiting amplifier and counting circuit which are entirely distinct from the limiting amplifier and counting circuit used in the receiver, in order to measure the frequency of the beat signal.

FIG. 1 shows an amplitude limiter stage which consists of a transistor 3 and resistors 1, 2 and 4; a counter circuit of the cup and bucket integrator type which consists of diodes 6 and 7, capacitors 5 and 8, and resistor 9, and a gate circuit which consists of resistors 9, 11 and 12, a capacitor 13 and a diode 10.

The collector and the emitter of transistor 3 are connected through resistors to a D.C. supply source. The collector is connected through resistor 2 to the positive terminal of the supply source and the emitter is connected through resistor 4 to the negative terminal of the supply source and also to ground. The base of the transistor is connected through the resistor 1 to terminal 14 of input terminals 14 and 15.

The capacitor 5 is inserted between the collector of the transistor 3 and the cathode of the diode 6, the anode of which is connected to ground. The cathode of the diode 6 is also connected to the anode of the diode 7. The capacitor 8 has one terminal connected to ground, and the second terminal is connected to the cathode of the diode 7, the anode of the diode 10, and via the resistor 9 to the negative terminal of a D.C. supply source, the positive terminal of which is connected to ground. The cathode of the diode 10 is connected to the junction of the resistors 11 and 12 which are connected in series between the positive and negative terminals of a D.C. supply source, the negative terminal of which is connected to ground. The cathode of the diode 10 is also connected via the capacitor 13 to terminal 16, of output terminals 16 and 17.

A signal voltage of substantially square waveform, derived from a sinusoidal received signal wave, and applied across terminals 14 and 15, produces an amplified signal voltage of substantially square waveform and constant amplitude between the collector of the transistor 3 and ground, like that shown in FIG. 2*a*.

When a positive transition of the signal voltage at the collector of the transistor 3 occurs a current pulse will flow through the diode 7, charging up the capacitor 5, the capacitance of which is small compared with that of the capacitor 8, and resulting in the production of a positive charge on the ungrounded plate of capacitor 8. When a negative transition of the signal voltage at the collector of the transistor 3 occurs, the diode 7 remains non-conducting, but a current pulse flows through the diode 6, discharging the capacitor 5. During the period that the diode 7 is non-conducting, the capacitor 8 discharges through the resistor 9 and the negative D.C. supply source. The values of the capacitor 8 and the resistor 9 are so chosen, that the capacitor 8 is completely discharged in a period which is less than that of the fundamental component of the highest beat signal frequency. The beat signal does not undergo integration in the counting circuit.

If the square wave signal shown in FIG. 2*a* is taken to represent the highest signal frequency, then the waveform of the voltage across the capacitor 8 is as shown in FIG. 2*b*. Owing to the fact that the resistor 9 is returned to a negative D.C. supply source, only the substantially linear portion of the decay curve of the voltage across the capacitor 8 is used. Provided that the fundamental frequency of the square wave signal is not higher than that shown in FIG. 2*a*, the peak value of the voltage wave across the capacitor 8 will not exceed the value shown. At frequencies higher than the fundamental component of the highest beat signal frequency, the capacitor 8 does not have time to discharge during the interval between the occurrence of positive transitions of the square wave signal, as shown in FIG. 2*e*. The peak value of the voltage across the capacitor 8 is increased owing to the superimposition of the saw-tooth wave derived from the wanted signal upon a D.C. voltage produced by integration of the interference pulses in the counter circuit.

The diode 10 is biassed in the reverse direction by resistors 11 and 12, in conjunction with the positive D.C. supply source, to a level indicated by the dotted line 18 in FIG. 2*d*, which is just above the peak value of the voltage wave shown in FIG. 2*b*. When, therefore, the frequency of the fundamental component of the square wave signal has a frequency equal to or below that of the signal shown in FIG. 2*a*, no signal will be passed by the diode 10. When the edges of the square wave signal are closer together as in the case of a signal of higher fundamental frequency, the peak of the voltage wave across the capacitor 8 is increased above the level indicated by the dotted line 18, and are passed by the diode 10. The waveform of the signal appearing across terminals 16 and 17 is shown in FIG. 2*e*.

In the embodiment under consideration, the A.C. signal which appears across terminals 16 and 17 is amplified integrated in a monostable multivibrator and after smoothing is applied to a relay which actuates a visual warning indicator. The signal appearing across terminals 16 and 17 could be processed differently in order to operate some other form of warning device.

It is not essential that the signal applied to the input terminals 14 and 15 is of square waveform. A sinusoidal signal, for example, could equally well be used provided that its amplitude was sufficient to produce a substantially square wave signal at the collector of the transistor 3.

The operation of the circuit with a typical received signal is shown in FIG. 3.

Figures 3A, 3B, 3C, 3D, 3E, 3F, 3G:
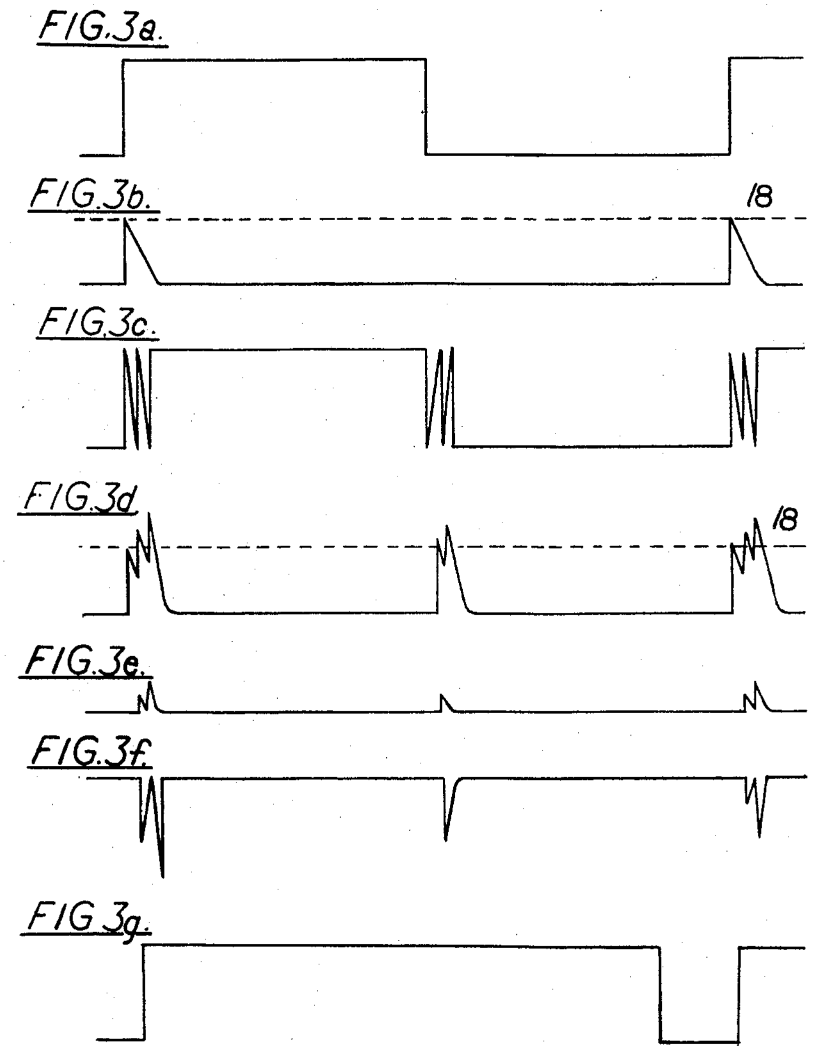

FIG. 3*a* shows the waveform of a square wave signal, free from interference pulses, at the collector of the amplifier-limiter transistor 3. The frequency of the signal is below the maximum for which the receiver system is designed.

FIG. 3*b* shows the resulting voltage waveform across the capacitor 8. There are no interference pulses superimposed on the transitions of the limited signal wave, therefore the level indicated by the dotted line 18, will not be exceeded.

FIG. 3*c* shows the waveform at the collector of the transistor 3 of a signal of the same frequency, as that shown in FIG. 3*a*. Due to the presence of interference super-imposed on the received signal, spurious transitions occur on the edges of the square waves.

FIG. 3*d* shows the resulting voltage waveform across the capacitor 8. The presence of the spurious signal transitions results in the peaks of the voltage wave rising above the level indicated by the line 18, which represents the value of the reverse bias applied to the diode 10.

FIG. 3*e* shows the waveform of the signal pulses across the output terminals 16 and 17.

FIG. 3*f* shows the waveform of the output signal pulses after further amplifications.

FIG. 3*g* shows the output signal waveform of the monostable multivibrator which is triggered by the pulses shown in *f* of FIG. 3. The period of this multivibrator is relatively unimportant as its function is to increase the average energy of the amplified output signal pulses. It is convenient to make its period about 60–70% of that of the fundamental component of the lowest signal frequency to be handled by the system. The multivibrator therefore operates as a frequency divider, being triggered again almost as soon as it relaxes into its stable condition. The signal, of which the waveform is shown in FIG. 3*g*, is applied to a smoothing circuit, and is used to energise a relay which actuates a visual warning device.

The fact that the gate circuit output signal consists of an A.C. wave enables it to be readily amplified up to a convenient level and facilitates rapid operation of the alarm circuit.

What I claim is:

1. In a radio receiver a warning circuit to produce a warning signal whenever undesired interference signals are received with desired sinusoidal signals comprising an amplitude limiter to produce a substantially square wave signal from said received sinusoidal signal having a predetermined frequency, a counting circuit of the integrator type, the output from the limiter being connected to the input to the counting circuit, a gate circuit, one input of which is connected to the output from the counting circuit, means to apply a direct current bias to a second input to the gate circuit, the bias being of such a value that a signal is obtained from the output of the gating circuit due to the presence of interference pulses in the limited signal when the frequency of the desired signal and the interference signal is greater than said predetermined frequency, and means to apply the output from the gate circuit to operate an indicator.

2. A radio receiver as claimed in claim 1 in which the output from the gate circuit is obtained via a capacitor.

3. A radio receiver as claimed in claim 1 in which the output from the gate circuit is applied via a monostable trigger circuit to the indicator.

References Cited in the file of this patent

UNITED STATES PATENTS

| | | |
|---|---|---|
| 2,915,648 | Chudleigh et al. | Dec. 1, 1959 |
| 2,995,706 | Clarridge | Aug. 8, 1961 |